US008743408B2

(12) United States Patent
Worrall

(10) Patent No.: US 8,743,408 B2
(45) Date of Patent: Jun. 3, 2014

(54) SELECTING A BINDER FILE DISPLAYED ON A GUI FOR STORAGE OF DOCUMENTS

(75) Inventor: Eric Worrall, March (GB)

(73) Assignee: Global Graphics Software Limited, Cambourne, Cambridge (GB)

( * ) Notice: Subject to any disclaimer, the term of this patent is extended or adjusted under 35 U.S.C. 154(b) by 437 days.

(21) Appl. No.: 12/879,349

(22) Filed: Sep. 10, 2010

(65) Prior Publication Data

US 2011/0063666 A1  Mar. 17, 2011

Related U.S. Application Data

(60) Provisional application No. 61/241,722, filed on Sep. 11, 2009, provisional application No. 61/241,739, filed on Sep. 11, 2009.

(51) Int. Cl.
*G06K 15/00* (2006.01)

(52) U.S. Cl.
USPC ........................................ 358/1.16; 358/1.15

(58) Field of Classification Search
CPC ... G06F 3/0483; G06F 3/0484; G06F 3/1205; G06F 3/1237; G06F 3/1262; H04N 1/00957
USPC ............................................... 358/1.15, 1.16
See application file for complete search history.

(56) References Cited

U.S. PATENT DOCUMENTS

| | | | |
|---|---|---|---|
| 5,392,387 A | 2/1995 | Fitzpatrick et al. | |
| 5,542,040 A | 7/1996 | Chang et al. | |
| 5,581,686 A | 12/1996 | Koppolu et al. | |
| 5,640,579 A | 6/1997 | Koppolu et al. | |
| 5,778,352 A | 7/1998 | Inoue et al. | |
| 6,026,416 A | 2/2000 | Kanerva et al. | |
| 6,061,696 A | 5/2000 | Lee et al. | |
| 6,370,553 B1 | 4/2002 | Edwards et al. | |
| 6,523,048 B2 | 2/2003 | DeStefano | |
| 6,809,748 B2 | 10/2004 | Watanabe et al. | |
| 7,051,036 B2 | 5/2006 | Rosnow et al. | |
| 7,114,128 B2 | 9/2006 | Koppolu et al. | |
| 7,268,909 B2 | 9/2007 | Nakagiri | |
| 7,571,425 B2 | 8/2009 | Lessly | |
| 7,590,807 B2 | 9/2009 | McGovern et al. | |
| 7,770,180 B2 | 8/2010 | Villaron et al. | |
| 7,996,436 B2 | 8/2011 | Schneider et al. | |

(Continued)

FOREIGN PATENT DOCUMENTS

WO  92/08199 A1  5/1992

OTHER PUBLICATIONS

Windows XP.*
Windows Vista.*

(Continued)

*Primary Examiner* — Eric A Rust
(74) *Attorney, Agent, or Firm* — Bruce E. Black; Lowe Graham Jones PLLC

(57) ABSTRACT

A method is provided for presenting documents using a binder file stored on a computer-readable storage medium where the documents in the binder file are presentable within a graphical interface that appears as a notebook binder. The method includes opening a printer driver; selecting a binder file from an interface of the printer driver; selecting a section of the selected binder file from the interface of the printer driver; and adding the document to the selected binder file with an indicator for the document specifying the selected section.

20 Claims, 4 Drawing Sheets

(56) References Cited

U.S. PATENT DOCUMENTS

| | | | |
|---|---|---|---|
| 8,466,441 | B2 | 6/2013 | Cory |
| 2001/0003186 | A1 | 6/2001 | DeStefano |
| 2002/0099741 | A1 | 7/2002 | Watanabe et al. |
| 2002/0118230 | A1 | 8/2002 | Card et al. |
| 2003/0106039 | A1 | 6/2003 | Rosnow et al. |
| 2003/0198929 | A1 | 10/2003 | Stuppy |
| 2004/0044693 | A1 | 3/2004 | Hadley et al. |
| 2004/0158655 | A1 | 8/2004 | Kremer |
| 2004/0179231 | A1 | 9/2004 | Savino et al. |
| 2004/0184106 | A1* | 9/2004 | Ferlitsch ................ 358/2.1 |
| 2005/0102610 | A1 | 5/2005 | Jie |
| 2005/0134871 | A1 | 6/2005 | Nakagiri |
| 2005/0193330 | A1 | 9/2005 | Peters |
| 2005/0198565 | A1 | 9/2005 | McChrystal |
| 2005/0246631 | A1 | 11/2005 | Mori et al. |
| 2005/0267894 | A1 | 12/2005 | Camahan |
| 2006/0112399 | A1 | 5/2006 | Lessly |
| 2006/0132813 | A1* | 6/2006 | Mitani et al. ............ 358/1.13 |
| 2007/0070415 | A1 | 3/2007 | Minato |
| 2007/0130177 | A1 | 6/2007 | Schneider et al. |
| 2010/0211515 | A1 | 8/2010 | Woodings et al. |
| 2011/0063666 | A1 | 3/2011 | Worrall |
| 2011/0066932 | A1 | 3/2011 | Worrall |
| 2011/0066966 | A1 | 3/2011 | Worrall et al. |

OTHER PUBLICATIONS

Adobe PDF.*
U.S. Appl. No. 12/879,329, filed Sep. 10, 2010.
U.S. Appl. No. 12/879,301, filed Sep. 10, 2010.
"How to make a 'proper' PDF file Windows XP," Biochemistry, University of Wisconsin-Madison, Aug. 10, 2012, http://www.biochem.wisc.edu/medialab/tutorials/pdf_wintel.aspx.
Shea, Dan, "Planet PDF—Insert pages into existing PDF documents with Acrobat," May 1, 2008; http://www.planetpdf.com/enterprise/article.asp?ContentID=Insert_pages_into+existing_P . . . downloaded Dec. 8, 2012.
Windows Microsoft Corporation, "Print to file," 2012; http://windows.microsoft.com/en-us/windows-vista/Print-to-file downloaded Aug. 10, 2012.
Official Communication for U.S. Appl. No. 12/879,301 mailed Mar. 28, 2012.
Official Communication for U.S. Appl. No. 12/879,301 mailed Aug. 28, 2012.
Official Communication for U.S. Appl. No. 12/879,301 mailed Dec. 12, 2012.
Official Communication for U.S. Appl. No. 12/879,301 mailed Oct. 11, 2013.
Official Communication for U.S. Appl. No. 12/879,329 mailed Sep. 12, 2012.
Official Communication for U.S. Appl. No. 12/879,329 mailed Jul. 3, 2013.
Official Communication for U.S. Appl. No. 12/879,301 mailed Mar. 17, 2014.
Official Communication for U.S. Appl. No. 12/679,329 mailed Apr. 10, 2014.

* cited by examiner

SELECTING A BINDER FILE DISPLAYED ON A GUI FOR STORAGE OF DOCUMENTS

CROSS-REFERENCE TO RELATED APPLICATIONS

This patent application claims the benefit of U.S. Patent Provisional Applications Ser. Nos. 61/241,739 and 61/241,722, both of which were filed on Sep. 11, 2009, both of which are incorporated herein by reference.

BACKGROUND

Many people who use computers in their day-to-day business are not computer experts. It would often be counterproductive to require them to be; they are needed for their other skills. As a result one of the challenges in designing software applications that will be used on computer workstations is to ensure that the users of such software can perform the tasks of their jobs rapidly and efficiently. If the user interface for an application is complex or confusing then an organization may provide significant training for their employees to use the application and may supply help desk personnel to deal with queries and problems; both of which may reduce productivity and increase the total cost of using the software.

Over the past few decades it has become commonplace to represent page-based documents on a computer display in a roughly consistent way, often as a more-or-less white rectangle with the same aspect ratio as a printed page, shown against a gray, black or colored background. As a result of consistent usage computer users are now familiar with this representation of a simple stream of pages. In the same way the use of scroll bars and "page up" and "page down" keys has become a part of the baseline knowledge that new staff may be expected to already understand. These commonly understood representations and methods of interaction do not, however, extend to a more complex collection of documents that is more than a simple, ordered, sequence of pages.

BRIEF SUMMARY

One embodiment is a method of presenting documents using a binder file stored on a computer-readable storage medium where the documents in the binder file are presentable within a graphical interface that appears as a notebook binder. The method includes opening a printer driver; selecting a binder file from an interface of the printer driver; selecting a section of the selected binder file from the interface of the printer driver; and adding the document to the selected binder file with an indicator for the document specifying the selected section.

Another embodiment is a computer readable storage medium having processor-executable instructions, the processor-executable instructions when installed onto a system enable the system to perform actions. The actions include displaying a printer driver interface; presenting a list containing at least one binder file within a first region of the printer driver interface for selection by a user; presenting, upon selection of a one of the at least one binder file, a list containing at least one section of the selected binder file within a second region of the printer driver interface for selection by the user; and adding, upon selection of a one of the at least one section, the document to the selected binder file with an indicator for the document specifying the selected section.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of computing device that includes a processor or any combination of computing devices where each device performs at least part of the process.

Suitable computing devices typically include mass memory and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Methods of communication can include both wired and wireless (e.g., RF, optical, or infrared) communications methods and such methods provide another type of computer readable media; namely communication media. Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Figure 1:
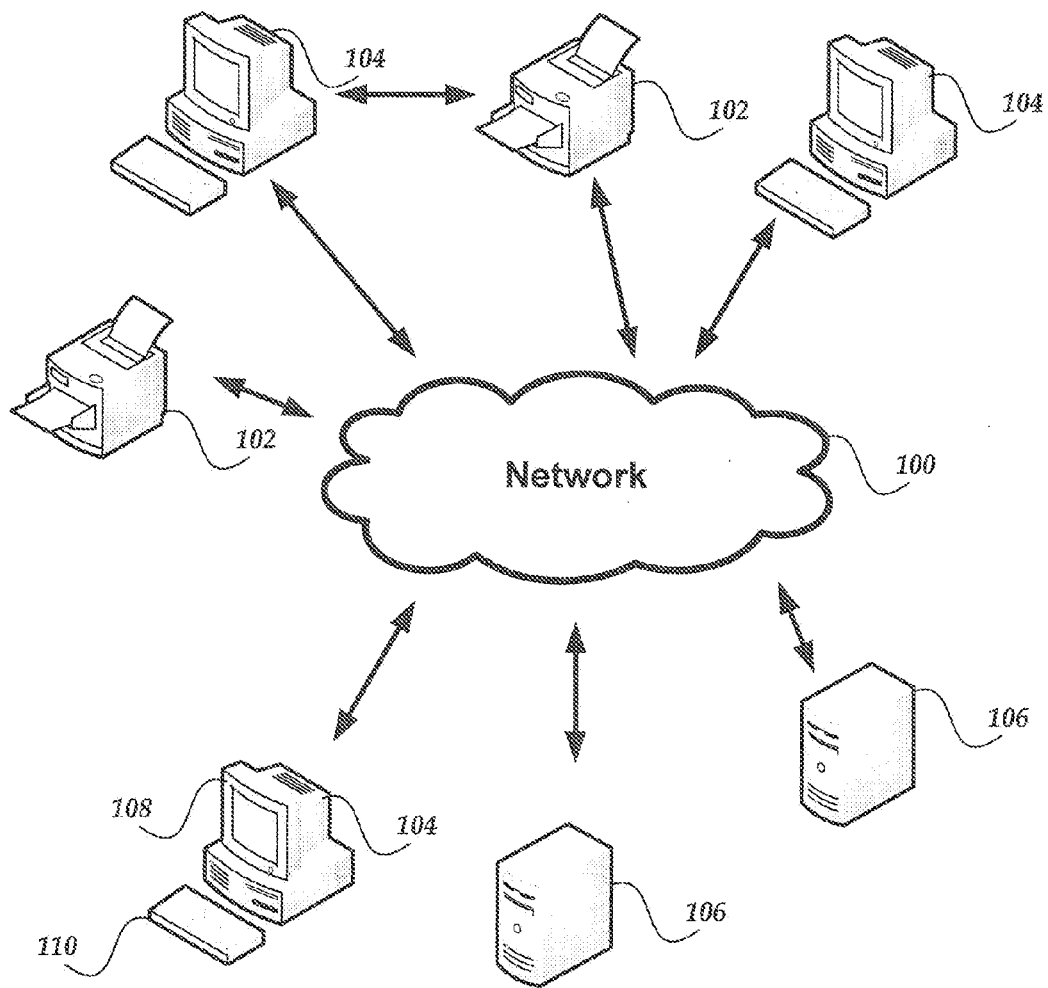
FIG. 1 is a schematic representation of one embodiment of an environment in which the invention can be employed.

FIG. 1 illustrates one embodiment of an environment for the invention. In FIG. 1, a network environment is illustrated, but it will be understood that the invention is also applicable to unnetworked computing devices as well. It will be understood that the network environment can be a local area network, a wide area network, or any combination thereof. It will also be understood that the network can include devices, other than those illustrated, coupled to the network and that there may be multiple devices of each type illustrated connected to the network. The illustrated environment includes a network 100 to which is attached, either directly or through other devices, one or more computing devices 104 (e.g., computers, workstations, and the like), one or more printers 102, and one or more servers 106. Other devices can optionally be attached to the network such as personal data assistants (PDA's), cameras, cellular telephones, portable storage devices (e.g., compact discs, DVDs, memory sticks, flash drives, or other optical or magnetic storage media), and the like. Any of these devices can be connected directly to the network or via another device such as a computing device 104, printer 102, or server 106. A computing device 104 typically includes a display 108 and one or more input devices 110, such a keyboard, mouse, trackball, and the like. The computing device will also typically include internal components, such as a processor, a mass memory, and one or more components for reading portable computer-readable media, as described above.

Storage and presentation of related documents together is one method of increasing efficiency. In the office and other environments, physical documents are often collected into physical binders (using, for example, a ring-binder, lever-arch binder, comb- or ring-binding) for storage and reference. Often the documents within the binder are divided into sections, where each section contains different classes (e.g., different subject matter or different type) of document. As an example a home user may file utility bills into a binder with electricity in one section, telephone bills into another section, and so on. Similarly, an accounts clerk may file invoices relating to different suppliers or different date ranges into separate sections. To provide a clear demarcation between the sections, and to allow for easy navigation when searching for a document within the binder, dividers may be used between the sections. Such dividers may be made from a heavier or stiffer medium than that on which the regular pages are printed, may be colored and may include a tab that extends beyond the edges of the pages of the documents within the binder. Each of these characteristics enables the division between sections to be found more easily and quickly.

Electronic documents are increasingly ubiquitous in business environments. When multiple documents are accessed together they can be organized in a variety of ways, including storage in a hierarchy of directories or folders on a computer, or by a conduit into a content management system running at the organization or department level. In at least some circumstances, there is value in maintaining a single file that contains a hierarchical document structure in a way that is easy to transfer between users while making it difficult to accidentally separate the constituent documents. Such a file will be referred to herein as a 'binder file'. The binder file format is described in the U.S. Provisional Patent Application 61/241,722 entitled "System and Method for Providing a Representation of Hierarchical Structures of Documents", filed on even date herewith, and incorporated herein by reference.

Figure 2:
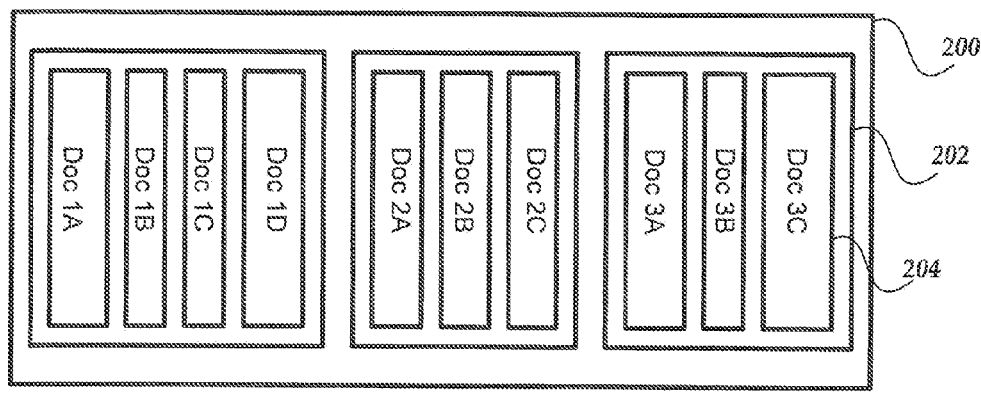
FIG. 2 is a schematic conceptualization of one embodiment of a binder file, according to the invention.

In at least some embodiments, the file with a binder format can be used to store multiple 'documents' within 'sections' within a single 'binder' file. FIG. 2 conceptually illustrates this concept with a binder file 200 containing multiple sections 202 with documents 204 distributed within the sections. It will be understood the three level hierarchy of document/section/binder is not exclusive and that the binder display metaphor may be extended to other depths, for example, by the depiction of sections and subsections.

Figure 3:
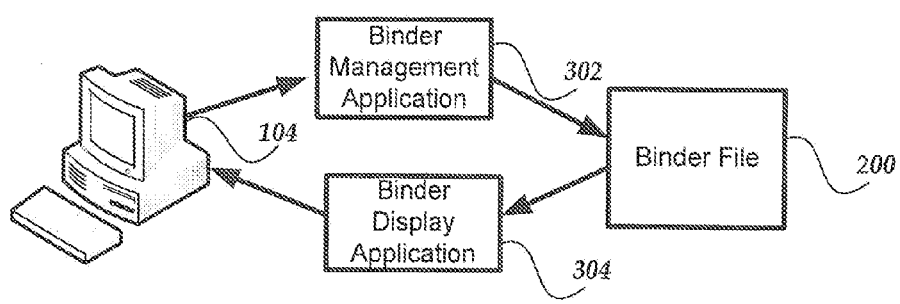
FIG. 3 is a schematic representation of elements of one embodiment of a system for management and display of content of a binder file, according to the invention.

As illustrated in FIG. 3, the binder file 200 can be created and modified using a binder management application 302. The binder file 200 can be displayed on a computing device 104 using a binder display application 304. It will be understood that the binder management application 302 and binder display application 304 can be components of a single software application or can be separate applications or even divided among any number of different application. Moreover, the binder management application 302 and binder display application 304 may reside on the same computing device or may reside on different devices. For example, a binder file 200 may be generated using the binder management application 302 on one computing device or using an external server and then imported to another computing device or server for display using the binder display application 304. In some instances, components of either or both of the binder management application and binder display application may reside on different computing devices or servers.

In some embodiments, a binder file may be created as a single process from a nominated set of documents. In other embodiments, a binder file may be maintained as a dynamic file that can be modified over time, with new documents being added, removed, or modified. At least a portion of the value to a user of maintaining such a binder file is in providing a useful interface to maintain, search, and read all of the constituent documents within the binder file. But that value could be outweighed if the method of adding new documents is too onerous. It is beneficial if new documents can be added efficiently and easily to the correct location within the binder file from a variety of document sources (e.g., applications such word processors, spreadsheets, document readers, computer aided design programs, e-mail programs, and the like.)

Within the binder file each document and section has metadata associated with it. Additional metadata may also be associated with the binder file as a whole. The specific set of metadata used may vary from one embodiment to another or may be configured by a user of an embodiment. For example, the metadata may include one more of the following: an identifier for each document (e.g., a number or a title for each document); an indicator in which section a document belongs; a locator for each document designating a defined position within a section; a label for each section (and possibly additional identification such as a color); or the order of sections within the binder. Other metadata may also be included for one or more (or even each) document, section, or binder such as creator or author name(s); creation date; identification of the source document from which this document within the binder was imported (as a directory/file path or as an identifier within a content management system or other infrastructure repository); the time/date at which the document or section was last modified; the time/date at which the document or section was created or added to the binder; a time/date in the future by which some activity must be performed; a table of contents for the binder; binder name; the storage location of one or more copies of the binder file (e.g., to allow for automatic updating of the copies when the binder file is altered); alternate document or section titles; recipient name(s) or title(s); keyword(s); and other items such as those described by the Dublin Core Metadata Initiative or that may be desirable for a specific use case.

There are a number of different methods for associating metadata with a document, section, or file. For example, metadata items may be generated automatically at the time of creation or editing of the binder, section or document. Metadata items may be automatically derived from a precursor representation of a document at the time that the binder is created or a document is added to an existing binder. Metadata items may be entered manually by a computer user or derived from some other external source. It will be understood that these methods may be used exclusively or in combination for any particular set of metadata or any particular metadata item.

In at least some embodiments, a user creates or opens a document in the software that they would normally use to do so. The document may be a file in its own right, such as a DOC file in Microsoft Word or a PDF file in Adobe Acrobat; or it may be an email message opened in a mail program, a web page opened in an internet browser, or a view opened in an infrastructure program such as IBM Lotus Notes.

When the user wishes to add the document to a pre-existing binder file, the user selects a specific printer driver that allows the user to select which binder file the document should be added to and which section within that binder the document should be added into. Additional options similar to those in many printer drivers may also be configured (such as the page size and orientation, whether fonts should be embedded in the created document, scaling of the pages of the document, and the like.) When the user approves the options as set the printer driver will add the new document to the selected section within the binder file after any other documents that may already be present within that section or at a position within the section selected by the user. Metadata associate with the document may be generated and added to the binder file automatically, by manual entry, or a combination of both automatic and manual entry.

The process of insertion of the new document into an existing section within a hierarchical collection of documents stored in a single file, by a tool that is accessible from the majority of applications used for document creation, editing and viewing on common operating systems is one feature of this invention. The use of a printer driver as that tool is a pragmatic way to deliver the functionality. It will be understood that documents may also be inserted into a binder by alternative methods, such as an application natively supporting such functionality, provision of an application-specific add-in to save or export a document into a binder, or by a tool that enables scanning of printed documents into a binder (with or without optical character recognition).

In at least some embodiments, the printer driver also allows the user to create a new binder. In at least some embodiments, the printer driver allows the user to provide at least some metadata such as a name for the binder. In at least some embodiments, the printer driver also allows the user to create a new section within an existing binder, to provide metadata such as a name for the section, and optionally to specify where the new section should be added within the pre-existing sequence of sections. In at least some embodiments, the printer driver also allows the user to select the position of the new document within the sequence of documents already present within the section selected.

In at least some embodiments, a menu of the application in which the document is created or modified includes a menu item to allow the document to be added to a binder file. Selection of the menu item will initiate the printer driver. Alternatively or additionally, selection of a menu item, such as "Print" will initiate an interface with a list containing one or more printers (if available), one or more applications (e.g., Adobe PDF) if available, and a binder option. Selection of the binder option will initiate the printer driver for the binder file application.

Figure 4:
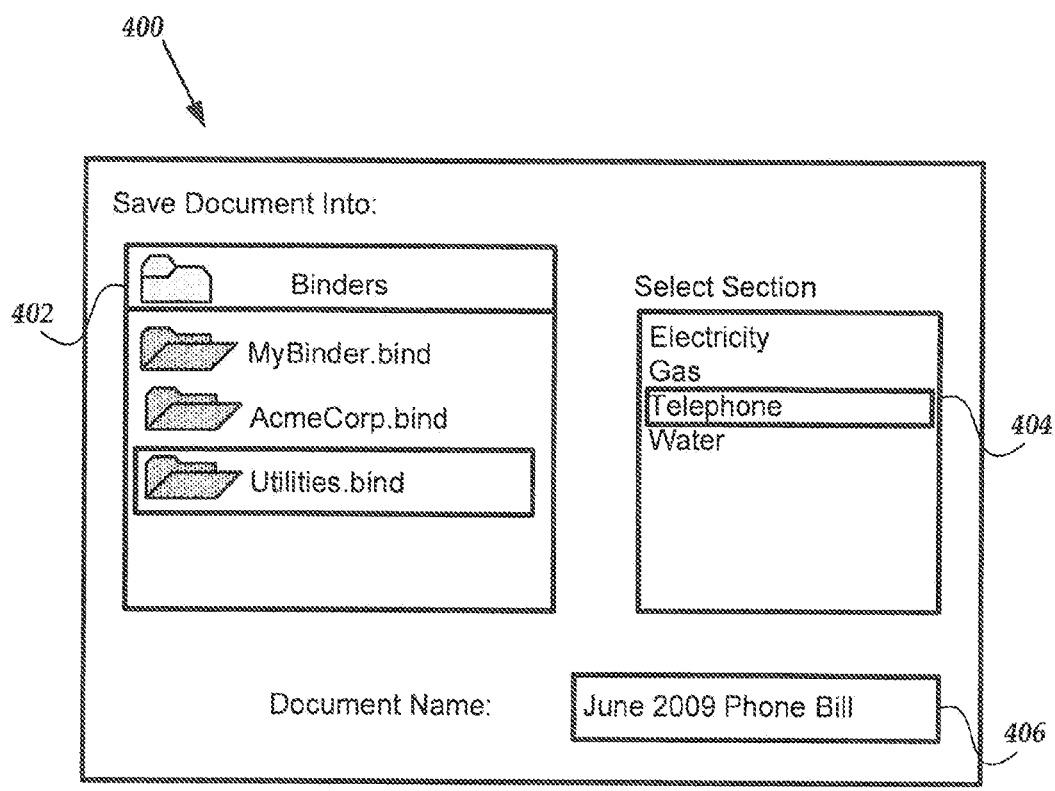
FIG. 4 is a schematic representation of one embodiment of a printer driver interface for adding a document to a binder file, according to the invention.

FIG. 4 illustrates one embodiment of a printer driver interface 400 to allow addition of the document into a binder file. The printer driver interface 400 provides a list of available binder files 402. The interface may optionally provide a mechanism to allow the user to select the directory or folder within the operating system filing system in which the binder that is to be added to is located. The user can then select a binder file within that directory or folder.

Upon selection of a binder file, the printer driver interface 400 can provide a list of sections 404 within the binder file. The user can select the section within the binder that the new document is to be appended to. The printer driver interface 400 may also provide a section 406 where metadata information can be added, for example, a title of the document. In some embodiments, the title of the document may be initially extracted from the document or from the filename of the document. Section 406 may allow the user to modify this initial title. It will be understood that the printer driver interface may include additional sections that allow for entry of other metadata.

In other embodiments, the printer driver interface manages all binder files centrally in such a way that the user sees only a single library of binders and is not therefore required to select a folder or directory in which the desired binder file is located. In at least some embodiments, the printer driver interface can include an option to create a new binder. In at least some embodiments, the printer driver interface can include an option to create a new section within a binder. In at least some embodiments, the printer driver interface can include an option to define the position of the new document within the sequence of any pre-existing documents.

Figure 5:
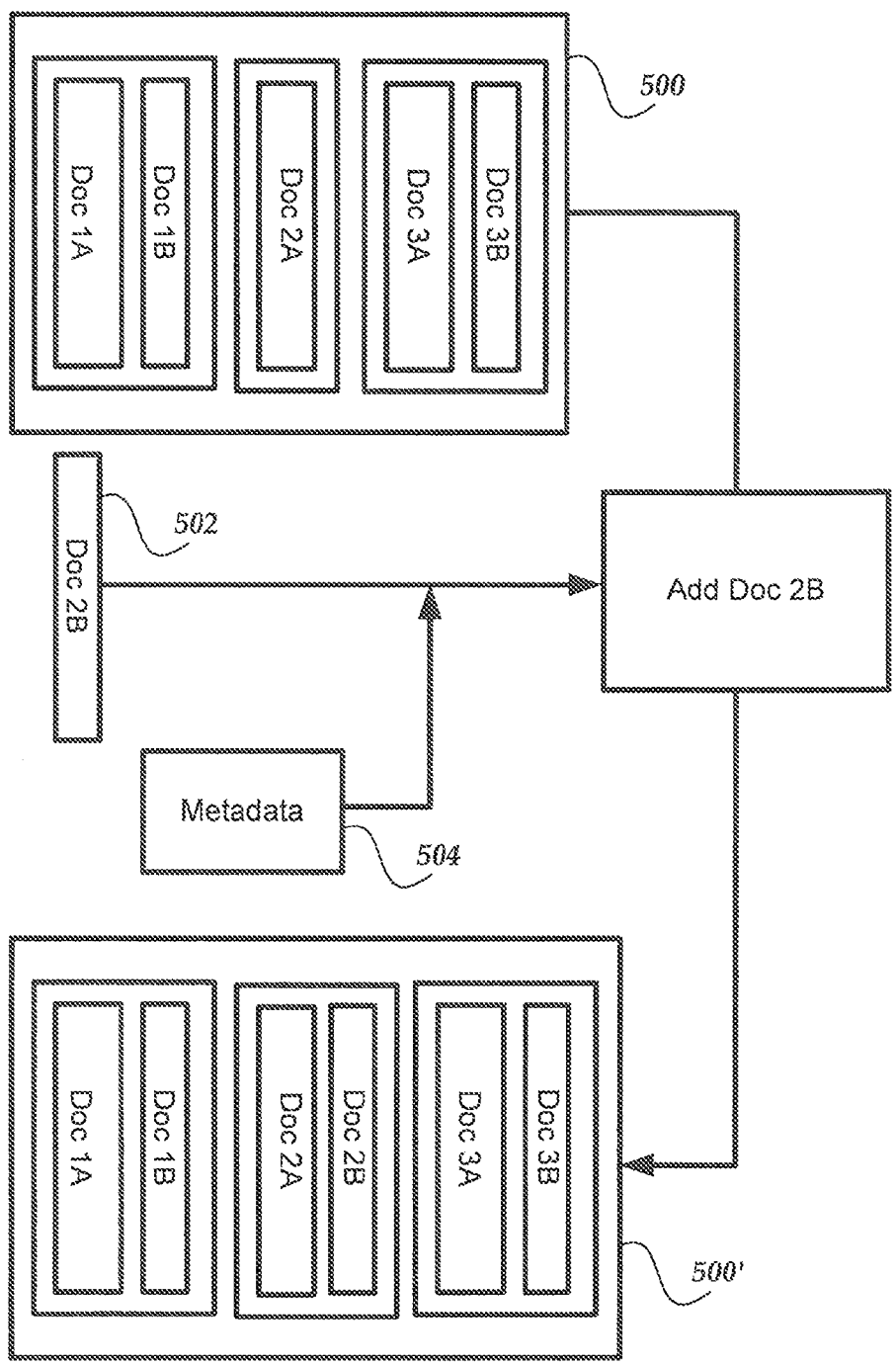
FIG. 5 is a schematic representation of one embodiment of a method of adding a document to a binder file, according to the invention.

FIG. 5 schematically illustrates one embodiment of a method of adding a new document 502 to a binder file 500 to create a modified binder file 500' that includes the new document. Metadata 504 is included with the new document 502 in the modified binder file 500. The metadata for the file may be generated automatically or manually or any combination thereof. For example, metadata such as the time and date of addition to the binder can be automatically generated by the application. Metadata, such as creation date, creator(s), title, and location of the source document can be automatically generated from the document file itself. Metadata, such as the section into which the document is placed or the document title, may be manually entered by the user.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. A method of presenting documents using a binder file stored on a computer-readable storage medium, wherein the documents in the binder file are presentable within a graphical interface that appears as a notebook binder, the method comprising:
   opening a printer driver;
   selecting a binder file from an interface of the printer driver;
   selecting a section of the selected binder file from the interface of the printer driver; and adding the document to the selected binder file with an indicator for the document specifying the selected section.

2. The method of claim 1, further comprising entering a name for the document into the interface of the printer driver, wherein adding the document to the binder file comprises adding the name for the document to the selected binder file as an identifier for the document.

3. The method of claim 1, wherein selecting a binder file comprises creating a new binder file and selecting the new binder file in the interface of the printer driver.

4. The method of claim 3, wherein creating a new binder file comprises creating a new binder file using the interface of the printer driver.

5. The method of claim 1, wherein selecting a binder file comprises creating a new section of the selected binder file and selecting the new section in the interface of the printer driver.

6. The method of claim 5, wherein creating a section comprises creating a new section using the interface of the printer driver.

7. The method of claim 1, further comprising selecting a position of the document within the selected section using the interface of the printer driver and wherein adding the document comprises adding a position indicator to the selected binder file based on the selected position of the document.

8. The method of claim 1, further comprising
displaying a graphical interface that appears as a notebook binder; and
displaying a portion of at least one of the documents in the binder file on a graphical page of the notebook binder of the graphical interface.

9. The method of claim 1, wherein adding the document comprises converting the document to a binder file format and adding the converted document to the selected binder file.

10. The method of claim 1, wherein selecting a binder file from an interface of the printer driver comprises:
selecting a directory or folder using the interface of the print driver;
displaying a list of at least one binder file in the selected directory or folder; and
selecting a one of the least one binder file in the list.

11. A non-transitory computer readable storage medium having processor-executable instructions, the processor-executable instructions when installed onto a system enable the system to perform actions for presenting documents using a binder file stored on a computer-readable storage medium, wherein the documents in the binder file are presentable within a graphical interface that appears as a notebook binder, the actions comprising:
displaying a printer driver interface;
presenting a list containing at least one binder file within a first region of the printer driver interface for selection by a user;
presenting, upon selection of a one of the at least one binder file, a list containing at least one section of the selected binder file within a second region of the printer driver interface for selection by the user; and
adding, upon selection of a one of the at least one section, the document to the selected binder file with an indicator for the document specifying the selected section.

12. The non-transitory computer readable storage-medium of claim 11, wherein the processor-executable instructions further enable the system to perform additional actions comprising:
presenting a region of the printer driver interface for user entry of a name for the document, wherein adding the document to the selected binder file further comprises adding the name for the document to the selected binder file as an identifier for the document.

13. The non-transitory computer readable storage-medium of claim 11, wherein the processor-executable instructions further enable the system to perform additional actions comprising:
providing an actuatable region in the printer driver interface which, when actuated by the user, facilitates creation of a new binder file.

14. The non-transitory computer readable storage-medium of claim 13, wherein providing an actuatable region in the printer driver interface further comprises providing a region in the printer driver interface for user entry of a name for the new binder file.

15. The non-transitory computer readable storage-medium of claim 11, wherein the processor-executable instructions further enable the system to perform additional actions comprising:
providing an actuatable region in the printer driver interface which, when actuated by the user, facilitates creation of a new section of the selected binder file.

16. The non-transitory computer readable storage-medium of claim 15, wherein providing an actuatable region in the printer driver interface further comprises providing a region in the printer driver interface for user entry of a name for the new section.

17. The non-transitory computer readable storage-medium of claim 11, wherein the processor-executable instructions further enable the system to perform additional actions comprising:
presenting a region of the printer driver interface for selection of a position of the document within the selected section using the interface of the printer driver and wherein adding the document further comprises adding a position indicator to the selected binder file based on the selected position of the document.

18. The non-transitory computer readable storage-medium of claim 11, wherein presenting at least one binder file within a first region of the printer driver interface for selection by a user comprises presenting a list containing at least one printer name and a user-selectable entry relating to the at least one binder file and, upon actuation of the user-selectable entry relating to the at least one binder file, presenting a list containing the at least one binder file.

19. The non-transitory computer readable storage-medium of claim 11, wherein presenting at least one binder file within a first region of the printer driver interface for selection by a user comprises presenting a list containing at least one printer name and a directory or folder containing the at least one binder file and, upon actuation of the user-selectable entry relating to the at least one binder file, presenting a list containing the at least one binder file.

20. The non-transitory computer readable storage-medium of claim 11, wherein adding the document comprises converting the document to a binder file format and adding the converted document to the selected binder file.

* * * * *